United States Patent
Sueyoshi et al.

(10) Patent No.: US 7,616,615 B2
(45) Date of Patent: Nov. 10, 2009

(54) PACKET FORWARDING APPARATUS FOR CONNECTING MOBILE TERMINAL TO ISP NETWORK

(75) Inventors: Noriyuki Sueyoshi, Yokohama (JP); Hiroaki Miyata, Yokohama (JP); Daiki Nozue, Fujisawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 256 days.

(21) Appl. No.: 11/342,850

(22) Filed: Jan. 31, 2006

(65) Prior Publication Data

US 2007/0053334 A1   Mar. 8, 2007

(30) Foreign Application Priority Data

Sep. 2, 2005 (JP) ............... 2005-254329

(51) Int. Cl.
*H04W 4/00* (2009.01)
(52) U.S. Cl. .................. 370/338; 370/328; 370/401
(58) Field of Classification Search .............. None
See application file for complete search history.

(56) References Cited

U.S. PATENT DOCUMENTS

| | | | |
|---|---|---|---|
| 7,152,238 B1 * | 12/2006 | Leung et al. | 726/2 |
| 2001/0044893 A1 * | 11/2001 | Skemer | 713/153 |
| 2002/0147837 A1 * | 10/2002 | Heller | 709/238 |
| 2006/0062228 A1 * | 3/2006 | Ota et al. | 370/401 |

FOREIGN PATENT DOCUMENTS

JP   2004-364271   12/2004

OTHER PUBLICATIONS

RFC 3775—Mobility Support in IPv6, 2004. pp. 1-118.
Network Working Group Request for Comments: 2408, Category: Standards T rack, by D. Maughan, et al. pp. 1-75, 1998.
RFC 2409- The Internet Key Exchange, Nov. 1998. pp. 1-30.

* cited by examiner

*Primary Examiner*—Erika A Gary
(74) *Attorney, Agent, or Firm*—Brundidge & Stanger, P.C.

(57) ABSTRACT

A packet forwarding apparatus enabling selective provider type access service in a mobile communication network, including a first group of line interfaces connected to routers deployed to service areas of a mobile network, a second group of line interfaces connected to the Internet or to routers belonging to different ISP networks, an ISP management table indicating correspondence of domain name of each ISP networks to an authentication server address, and a controller that identifies, upon receiving from a mobile terminal a request to connect to one of said ISP networks, the domain name of the ISP network from a user ID in the request, transmits an authentication request including the user ID and password specified in said request to an authentication server associated with the ISP network, based on said ISP management table, and notifies the mobile terminal of a result of authentication by said authentication server.

11 Claims, 15 Drawing Sheets

FIG. 5A

| Initiator Cookie ||||| |
|---|---|---|---|---|
| Responder Cookie ||||| |
| Next Payload | Mj Ver | Mn Ver | Exchange Type | Flags |
| Message ID ||||| |
| Length ||||| |
| Next Payload | Reserved || Payload Length ||
| Vender ID ||||| |
| Next Payload | Reserved || Payload Length ||
| Type | Reserved || Identifier ||
| Attributes ||||| |

701 — Vender ID row
702 — Type row
703 — Attributes row

FIG. 5B

Xauth REQUEST

Vender ID  : 0x09002689DFD6B712
    Type       : ISAKMP-CFG-REQUEST
    Attributes : XAUTH-USER-NAME = ""
                 XAUTH-USER-PASSWORD = ""

FIG. 5C

Xauth REPLY

Vender ID  : 0x09002689DFD6B712
    Type       : ISAKMP-CFG-REPLY
    Attributes : XAUTH-USER-NAME = "usera@ispa.com"
                 XAUTH-USER-PASSWORD = "aaaa"

FIG. 5D

Xauth SET

Vender ID  : 0x09002689DFD6B712
    Type       : ISAKMP-CFG-SET
    Attributes : XAUTH-STATUS = "OK"
                 XAUTH-MESSAGE = "2001::1100"

PACKET FORWARDING APPARATUS 10

FIG. 8A

USER MANAGEMENT TABLE 16

| USER ID (161) | PASS-WORD (162) | HoA (163) | CoA (164) | LIFE TIME (165) | ISP-ADAPT-IVE VR (166) | OTHER INFOR-MATION (167) | |
|---|---|---|---|---|---|---|---|
| usera@ispa.com | aaaa | 2001::1 | 3001::1 | 300 | ispa-VR | | 160-1 |

FIG. 8B

| USER ID (161) | PASS-WORD (162) | HoA (163) | CoA (164) | LIFE TIME (165) | ISP-ADAPT-IVE VR (166) | OTHER INFOR-MATION (167) | |
|---|---|---|---|---|---|---|---|
| usera@ispa.com | aaaa | 2001::1 | 3001::1 | 250 | ispa-VR | | 160-1 |
| userb@ispb.com | bbbb | 2002::1 | 3002::1 | 200 | ispa-VR | | 160-2 |
| ⋮ | ⋮ | ⋮ | ⋮ | ⋮ | ⋮ | ⋮ | |
| userz@ispz.com | zzzz | 2021::1 | 3021::1 | 300 | ispn-VR | | 160-j |

FIG. 9

ISP MANAGEMENT TABLE 17

| DOMAIN NAME (171) | ISP-ADAPTIVE VR (172) | RADIUS SERVER ADDRESS (173) | |
|---|---|---|---|
| ispa.com | ispa-VR | 2001:1::1 | 170-1 |
| ispb.com | ispb-VR | 2002:1::1 | 170-2 |
| ⋮ | ⋮ | ⋮ | |
| ispz.com | ispz-VR | 2021:1::1 | 170-k |

FIG. 10

ROUTING INFORMATION MANAGEMENT TABLE 18

| ISP-ADAPTIVE VR (181) | NETWORK ADDRESS (182) | GATEWAY ADDRESS (183) | |
|---|---|---|---|
| ispa-VR | 2001:1:: | 2001:10::1 | 180-1 |
| ispa-VR | 2001:2:: | 2001:10::1 | 180-2 |
| ispb-VR | 2002:1:: | 2002:10::1 | 180-3 |
| ispb-VR | 2002:2:: | 2002:10::1 | 180-4 |
| ⋮ | ⋮ | ⋮ | |
| ispz-VR | 2021:2:: | 2021:10::1 | 180-p |

FIG. 11

ROUTING TABLE 200 FOR ROUTER 20-1

| NETWORK ADDRESS (201) | GATEWAY ADDRESS (202) |
|---|---|
| 2001:1:: | 2001:10::ffff |
| 2001:2:: | 2001:10::ffff |
| ⋮ | ⋮ |
| 2021:2:: | 2021:10::ffff |

MN MANAGEMENT TABLE 38

| USER ID | PASS-WORD | HOME AGENT ADDRESS | HoA | CoA | OTHER IN-FORMATION |
|---|---|---|---|---|---|
| usera@ispa.com | aaaa | 3000::ffff | — | — | |

| USER ID | PASS-WORD | HOME AGENT ADDRESS | HoA | CoA | OTHER IN-FORMATION |
|---|---|---|---|---|---|
| usera@ispa.com | aaaa | 3000::ffff | — | 3001::1 | |

| USER ID | PASS-WORD | HOME AGENT ADDRESS | HoA | CoA | OTHER IN-FORMATION |
|---|---|---|---|---|---|
| usera@ispa.com | aaaa | 3001::ffff | 2001::1 | 3001::1 | |

PACKET FORWARDING APPARATUS FOR CONNECTING MOBILE TERMINAL TO ISP NETWORK

CLAIM OF PRIORITY

The present application claims priority from Japanese application serial No. 2005-254329, filed on Sep. 2, 2005 the content of which is hereby incorporated by reference into this application.

BACKGROUND OF THE INVENTION (1) Field of the Invention

The present invention relates to a packet forwarding apparatus and, more particularly, to a packet forwarding apparatus capable of connecting between a mobile network and a plurality of ISP networks and selectively connecting a mobile terminal to an ISP network with which the mobile terminal has a service contract.

(2) Description of Related Art

In recent years, broadband environments for access from end users to the Internet have been developed rapidly with high-speed access line technology such as Asynchronous Digital Subscriber Line (ADSL), Fiber to the Home (FTTH), and CATV. Internet usage is diversified and Internet access from terminals connected to a mobile communication network increases rapidly.

As a communication protocol for IP communication on a mobile communication network, Mobile IPv6 specifications are standardized in RFC 3775 of the Internet Engineering Task Force (IETF). The Mobile IPv6 basically inherits IPv4-adaptive Mobile IP functions specified in RFC 3220. A Mobile IPv6 network comprises mobile nodes (MNs), home agents (HAs), and correspondent nodes (CNs), wherein each MN is assigned its home address HoA which remains unchanged while the MN roams.

When a mobile node MN leaves its home link having the same prefix as HoA and moves to another link (a foreign link), the MN obtains a Care of Address (CoA) to be used there. The MN receives a Router Advertisement (RA) message which is periodically transmitted by a router located in the foreign link and recognizes that it has moved to another link by detecting that the source address of the received message has a prefix different from its HoA or its current CoA.

When getting a new CoA in the foreign link, the MN transmits a location registration request message BU (Binding Update) including the HoA and the new CoA to its home agent HA. Upon receiving the BU message from the MN, the home agent HA stores the HoA and CoA indicated in the received message into a Binding Cache management table as binding information and multicasts a control message to adjacent routers so that the HA can capture packets destined to the HoA of the MN. In consequence, a packet transmitted from a correspondent node CN, addressed to the HoA of the MN, are captured by the HA. Upon receiving the packet addressed to the HoA of the MN, the HA adds an encapsulation header including the CoA of the MN as the destination address to the received packet and forwards the packet to the foreign link to which the MN is visiting.

As communication protocols that apply to the communication between MN and HA in Mobile IP, the following are known: e.g., Internet Security Association and Key Management Protocol (ISAKMP) defined in RFC 2408, The Internet Key Exchange (IKE) defined in RFC 2409, and Extended Authentication within ISAKMP/Oakley (Xauth) which is under consideration in draft-ietf-ipsec-isakmp-xauth-06.

In the case of IPv4, CoA can be obtained from a DHCP (Dynamic Host Configuration Protocol) server. In the case of IPv6, CoA can be generated automatically by combining a prefix value of the source address (router address) of an RA message and a part of the MAC address of the MN.

As regards HoA assignment, for example, Japanese Unexamined Patent Publication No. 2005-364271 proposes a method for use in a mobile network system where a whole local network including mobile nodes and a mobile router is movable. In this prior art, the mobile router transmits a request for HoA assignment to a location management server and the location management server notifies the mobile router of an unused address retrieved from an address management table as HoA.

From a viewpoint of how the service is provided, Internet access service is classified into all-in-one provider type access service and selective provider type access service.

In the all-in-one provider type access service, access line service to provide an access line to a user and Internet connection service is offered by the same provider entity. Current mobile communication networks are operated with this type of Internet access. On the other hand, in the selective provider type access service, an access line such as ADSL and FTTH is offered from an access line provider and Internet connection service is offered by a plurality of Internet Service Providers (ISPs) different from the access line provider.

In a stationary communication network, the selective provider type access service is applied in a historical consequence and to meet user preference. As a typical network configuration for realizing the selective provider type access service, a scheme is known in which a connection is set up via a Layer 2 Tunneling Protocol (L2TP) on a user-by-user basis between an LAC (L2TP access concentrator) accommodating access lines provided by an access line provider and an LNS (L2TP Network Server) to which an ISP network managed by an ISP is connected.

SUMMARY OF THE INVENTION

If the selective provider type access service used in a stationary communication network is applied to a mobile communication network as well, a network for connecting a mobile network and an ISP network must be consistent with Mobile IP. In the Mobile IP, binding information between HoA and CoA has to be managed for MN location management, as described above. However, if a mobile network is used as an Internet access network, it is impossible to make a dynamical connection change following terminal movement, because L2TP having been applied to connect an access network and an ISP network in the conventional stationary communication network has no concept of terminal location management.

An object of the present invention is to provide a packet forwarding apparatus enabling the selective provider type access service in a mobile communication network.

An other object of the present invention is to provide a packet forwarding apparatus capable of ensuring communication of packets destined to HoA even after a mobile terminal gets a new CoA in the mobile network.

To achieve the above objects, a packet forwarding apparatus according to the present invention comprises a first group of line interfaces for connecting to a plurality of routers deployed to service areas forming a mobile network, a second group of line interfaces for connecting to the Internet or to routers belonging to different Internet Service Provider (ISP) networks, an ISP management table comprising a plurality of entries, each indicating the correspondence of domain name of each ISP networks to an authentication server address, and a controller.

In one aspect, the packet forwarding apparatus is characterized in that the controller identifies, upon receiving from a mobile terminal a request to connect to one of said ISP networks with which the mobile terminal has a service contract, the domain name of the ISP network from a user ID included in the connection request, transmits an authentication request including the user ID and password specified in said connection request to an authentication server, which is associated with the ISP network, according to the authentication server address corresponding to the domain name retrieved from the ISP management table, and notifies the requesting mobile terminal of a result of authentication received from the authentication server.

One feature of the packet forwarding apparatus according to the present invention resides in that the controller transmits to a requesting mobile terminal a message indicating a home address to be assigned to the mobile terminal in response to the result of authentication received the authentication server. The home address to be assigned to the mobile terminal may be retrieved from an address pool on the packet forwarding apparatus or may be received together with the result of authentication from the authentication server.

An other feature of the packet forwarding apparatus according to the present invention resides in that the apparatus further comprises a user management table comprising a plurality of entries, each indicating the correspondence of the user ID of each mobile terminal using said mobile network to a home address and a care-of address, and the controller converts a packet destined to the home address of a mobile terminal into an encapsulated packet destined to the care-of address specified in the user management table when the packet was received from one of the first group line interfaces, and transmits the packet to the mobile network through one of the first group line interfaces corresponding to the care-of address.

Yet another feature of the packet forwarding apparatus according to the present invention resides in that the controller searches the user management table for an entry corresponding to the mobile terminal when a connection request is received from the mobile terminal, and transmits a message indicating the home address to the mobile terminal without transmitting an authentication request to the authentication server, if the address of the mobile terminal has been registered in said user management table.

In another aspect, a packet forwarding apparatus according to the present invention is characterized in that the apparatus is connectable to a plurality of routers deployed to service areas forming a mobile network and to a plurality of routers belonging to different Internet Service Provider (ISP) networks, and comprises an ISP management table comprising a plurality of entries, each indicating the correspondence of a domain name of each ISP network to an authentication server address, a user management table for managing binding information of home address and care-of address for a plurality of groups of mobile terminals subscribed to different ISP networks, and means for selectively relaying each of Internet connection requests from mobile terminals connected to the mobile network to one of the ISP networks with which the mobile terminal has a service contract and terminating Mobile IP location registration requests from the plurality of groups of mobile terminals subscribed to different ISP networks.

The packet forwarding apparatus can offer selective provider type access service to users of mobile terminals, because it functions as a home agent common to a plurality of ISP networks, connects a mobile terminal selectively to an ISP network with which the mobile terminal has a service contract, and terminates Mobile IP location registration requests from different groups of mobile terminals.

BRIEF DESCRIPTION OF THE DRAWINGS

FIGS. 5A to 5D illustrate a message format in accordance with Xauth protocol.

FIGS. 8A and 8B illustrate an embodiment of a user management table 16 provided in the packet forwarding apparatus 10 of the present invention.

FIG. 9 illustrates an embodiment of an ISP management table 17 provided in the packet forwarding apparatus 10 of the present invention.

FIG. 10 illustrates an embodiment of a routing information management table 18 provided in the packet forwarding apparatus 10 of the present invention.

FIG. 11 illustrates an embodiment of a routing table 200 provided in a router 20.

DETAILED DESCRIPTION OF THE PREFERRED EMBODIMENTS

Illustrative embodiments of the present invention will be described herein after with reference to the drawings.

Figure 1:
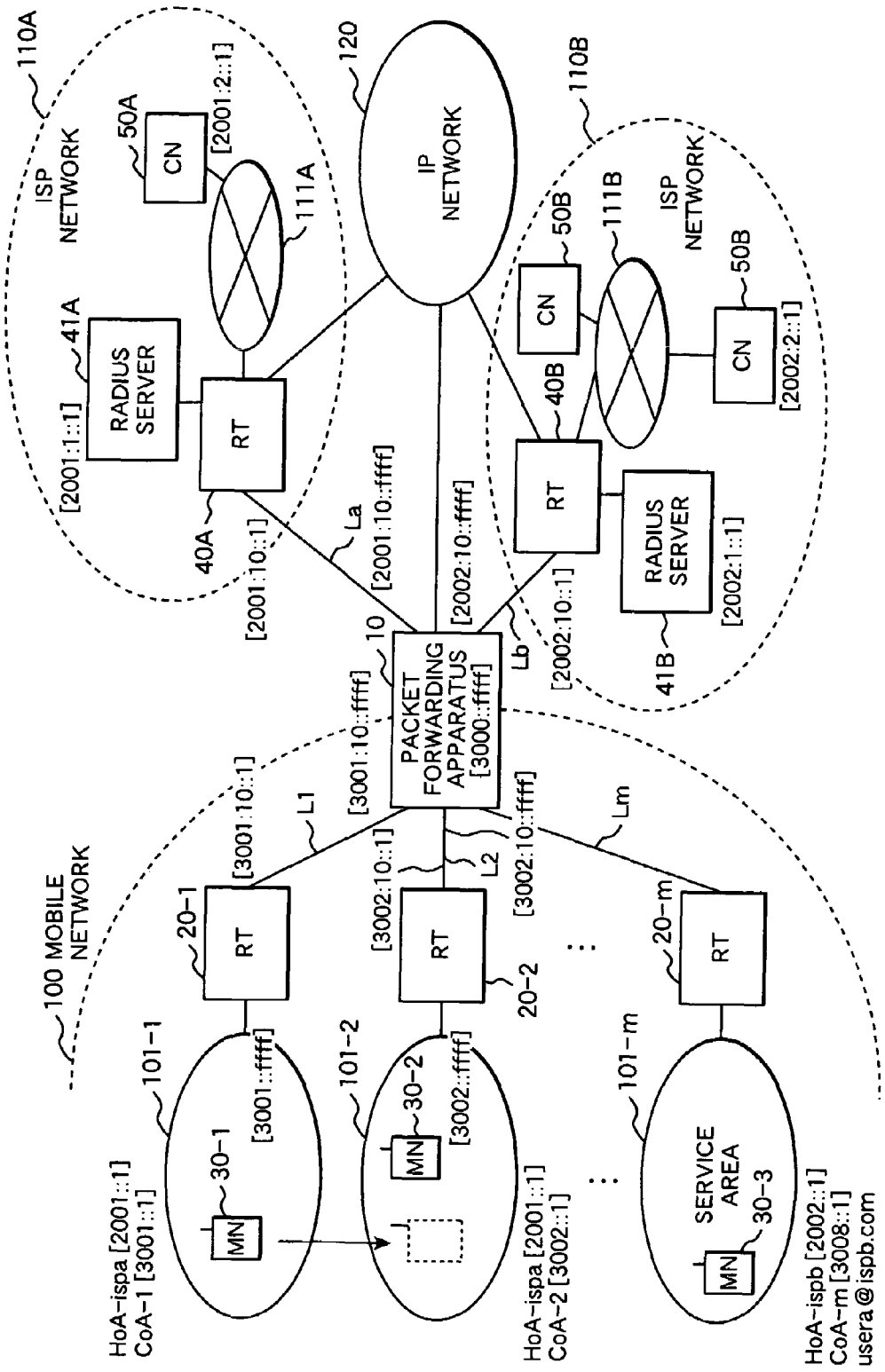
FIG. 1 shows an example of a communication network to which the packet forwarding apparatus 10 of the present invention is applied.

FIG. 1 shows an example of a communication network to which the packet forwarding apparatus 10 of the present invention is applied.

The communication network shown here comprises a mobile network 100, an IP network 120, and a plurality of ISP networks 110 (110a, 110B, etc.) which provide a connection service of the IP network 120. The packet forwarding apparatus 10 of the present invention is connected to the mobile network 100, each of ISP networks 110, and the IP network 120.

The mobile network 100 forms a plurality of service areas (service links) 101 (101-1 to 101-m) where communication services are provided to mobile terminals MNs 30 (30-1, 30-2, etc.) according to Mobile IP protocol. Each service area 101 comprises, for example, one or more wireless base stations for communicating with each MN 30 through a wireless channel and a base station controller connected to these base stations, wherein each base station controller is connected to the packet forwarding apparatus 10 via a router 20 (20-1 to 20-m) and a communication line L (L1 to Lm). However, each service area 101 may be configured so that wireless base stations are directly accommodated to a router 20 or MNs are connected wired or wirelessly to a LAN connected to a router 20.

To access the IP network 120 from the mobile network 100, each subscriber makes a contract with a mobile network provider (service provider: ISP) that provides Internet connection service. After that, the subscriber can communicate with a server or terminal (not shown) connected to the IP network 120 via the ISP network 110 contracted with the subscriber. In the following description, a mobile terminal 30 connected from a service area 101 to the IP network 120 will be referred to as an MN (Mobile Node). Each MN can move from one service area to another service area during communication, for example, like the MN 30-1 whose moving direction is indicated by an arrow.

Each ISP network 110 includes a router 40 (40A, 40B, etc.) connected to the packet forwarding apparatus 10 via a communication line L (La, Lb, etc.) and a RADIUS (Remote Authentication Dial In User Service) server 41 (41A, 41b, etc.) standardized by the IETF, for example, as an authentication server provided with functions of authenticating an ISP subscriber having a service contract with the ISP, accounting, managing the home address (HoA) of each MN, etc. To each router 40, ISP's subscriber terminals 50 (50A, 50B) are connected via an access network 111 (111A, 111B, etc.). Although separate access networks are shown here for each ISP network, a common public network may be used instead. In the following description, a peer terminal, which is connected to an access network 111 or the IP network 120 and communicates with an MN, will be referred to as a correspondent node CN. Service Providers that own the ISP networks 110A, 110B will be referred to as ISP-A, ISP-B, respectively.

In FIG. 1, numbers specified in brackets [ ], attached to the network constituent elements, MNs, and CNs are examples of IP address values assigned to each element. The values of HoA and CoA assigned to the MN 30-1 are example values of the home address and the care-of address of the MN 30-1. Here, it is assumed that the user of the MN 30-1 is a subscriber who made a service contract with a service provider ISP-A.

HoA-ispa [2001::1] denotes that the home address of the MN 30-1 is [2001::1] and CoA-1 [3001::1] denotes that the value of a care-of address obtained by the MN 30-1 in a service area 101-1 is [3001::1]. When the MN 30-1 moves from the service area 101-1 to another area 101-2, the care-of address is changed, as shown by CoA-2, to a new value [3002::1] obtained in the service area 101-2. The HoA value remains unchanged.

The care-of address CoA-1 is an IP address temporarily assigned to the MN 30-1 as long as the MN 30-1 is connected to the service area 101-1. When the connection between the MN 30-1 and the service area 101-1 is disconnected, the CoA-1 becomes invalid. Likewise, the care-of address CoA-2 is an IP address temporarily assigned to the MN 30-1 as long as the MN 30-1 is connected to the service area 101-2.

The packet forwarding apparatus 10 of the present invention operates as a home agent that is common for a plurality of groups of MNs 30 connected to the mobile network 100, each group having a service contract with a different ISP. Each MN 30 stores in advance the IP address ([3000::ffff] in this example) of the packet forwarding apparatus 10 as a home agent (HA) address.

Figure 2:
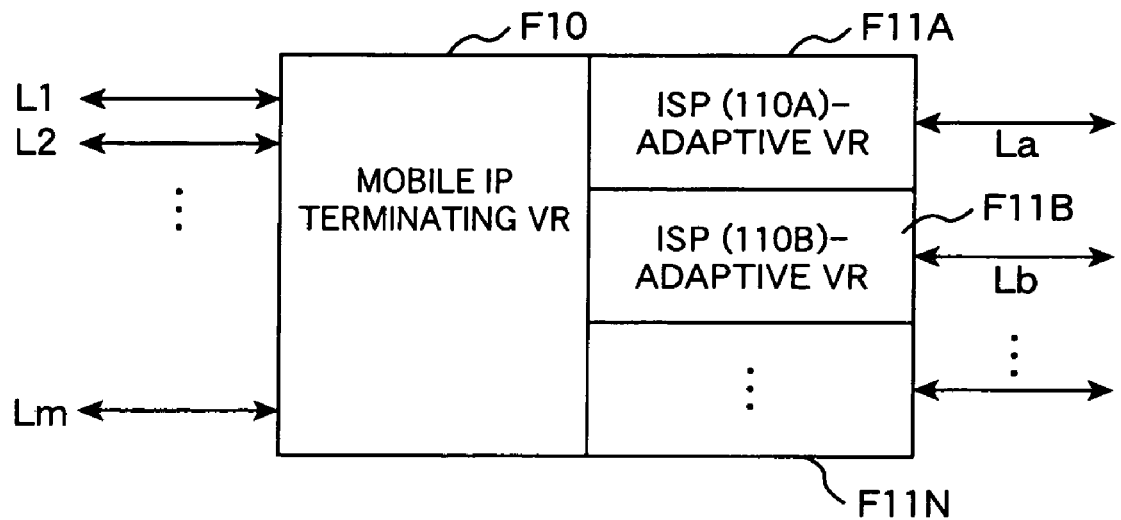
FIG. 2 schematically outlines the functions of the packet forwarding apparatus 10 of the present invention.

As shown in FIG. 2, the packet forwarding apparatus 10 logically has a function F10 as a Mobile IP terminating VR (Virtual Router) for terminating Mobile IP communication with each MN 30 and operating as the home agent and functions F11 (F11A, F11B, . . . FN) as ISP-adaptive VRs that terminate RADIUS protocol communication with the RADIUS servers 41 (41A, 41B, etc.) belonging to the ISP networks 110 (110A, 110B, etc.), respectively.

The packet forwarding apparatus 10 is also provided with, as will be described later by referring to FIGS. 8 and 9, a user management table 16 for storing the correspondence of user ID to HoA and CoA for each MN user and an ISP management table for indicating the correspondence of a domain name (e.g., @ispa.com) extracted from the user ID (e.g., usera@ispa.com) of an MN 30 to an ISP-adaptive VR identifier and a RADIUS server address. In the present embodiment, the user management table 16 also takes the role of a Binding Cache management table that a Mobile IP home agent has.

When an MN 30 issues a request for connection to the ISP network 110, the Mobile IP terminating VR function F10 obtains the user ID and password from the MN 30 and identifies, by referring to the ISP management table, an ISP-adaptive VR corresponding to the ISP contracted with the MN 30 user. When the MN 30-1 issues the connection request, for example, an ISP-adaptive VR function F11A is selected.

The ISP-adaptive VR function F11A transmits an authentication request including the user ID and password of the MN 30-1 to the RADIUS server 41A according to the RADIUS server address specified in the ISP management table. If the password specified in the authentication request matches with a password registered in advance by the subscriber at the time of contract, the RADIUS server 41A returns a response message indicating successful authentication to the packet forwarding apparatus 10.

In the present embodiment, the RADIUS server 41A pools home addresses HoA to be assigned to subscriber terminals and notifies the packet forwarding apparatus 10 of the HoA to be used by the MN 30-1 in the response message of the authentication result. The ISP-adaptive VR function F11A stores the HoA specified in the authentication response in association with the user ID and CoA into the user management table. The HoA is notified to the MN 30-1 by the Mobile IP terminating VR function F10.

Upon receiving the HoA notification, the MN 30-1 transmits a location registration request message (Binding Update) including the HoA and the CoA obtained in the service area 101-1 to the packet forwarding apparatus (home agent) 10 according to the location registration sequence in the Mobile IP.

Upon receiving the location registration request message, the packet forwarding apparatus 10 verifies the HoA and CoA specified in the received message against HoA and CoA registered in association with the user ID in the user management table (Binding Cache management table) 16 and, if the received HoA and CoA have no problem, transmits a response message (Binding Acknowledgement) to the MN 30-1. If the received HoA and CoA mismatch with the HoA and CoA registered in the user management table 16, the packet forwarding apparatus 10 disconnects the communication with the MN 30-1 and deletes the HoA and CoA (Binding information) for the MN 30-1 from the user management table.

By referring to the user management table 16, the packet forwarding apparatus 10 becomes able to convert an IP packet transmitted by a CN, addressed to the HoA of the MN 30-1, into an encapsulated IP packet addressed to the CoA and forward the encapsulated packet to the mobile network 100.

Figure 3A:
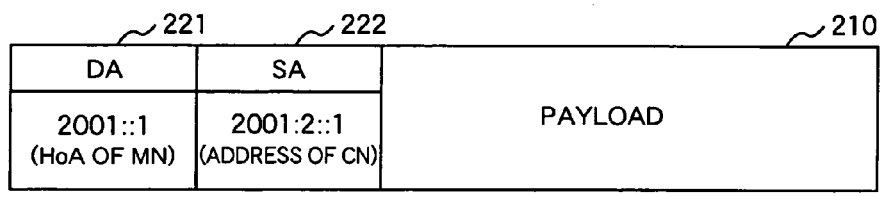
FIGS. 3A to 3C illustrate conversion between a packet that the packet forwarding apparatus 10 of the present invention receives from an ISP network and a packet to be forwarded to a mobile network.
Figure 3B:
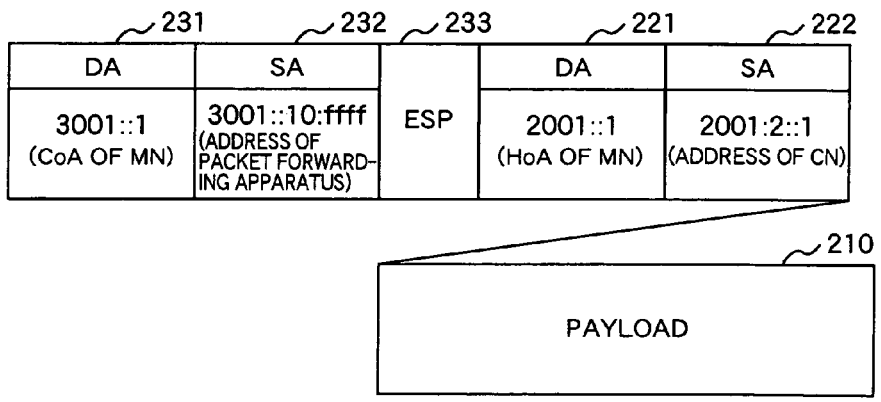
Figure 3C:
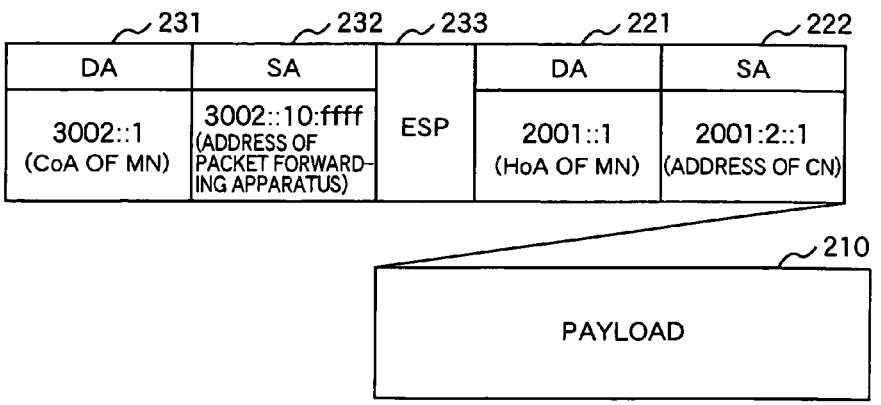

FIGS. 3A to 3C illustrate packet formats for a packet that the packet forwarding apparatus 10 communicates with an ISP network 110 and a packet to be communicated with the mobile network 100.

FIG. 3A shows the format of a packet that is transmitted from a CN 50A to the MN 30-1 as an example of a packet transferred over an ISP network. The packet 200 includes the home address HoA of the MN 30-1 as the destination address (DA) 221 and the address of the CN 50A as the source address (SA) 222 in an IP header added to the payload 210.

The packet forwarding apparatus 10 converts the packet 200 into a format shown in FIG. 3B and transfers the converted one to a line L1 for the mobile network 100. In this conversion, the packet 200 is encapsulated with an IP header including new destination address DA 231 and source address SA 232. The DA 231 indicates the care-of address CoA of the MN 30-1 and the SA 232 indicates the connection port address of the line L1 in the packet forwarding apparatus 10. ESP 233 denotes information for Internet Protocol Security (IPsec) included in the encapsulation IP header.

FIG. 3C shows the format of a packet addressed to the MN 30-1, which is transferred to the mobile network 100 by the packet forwarding apparatus after the MN 30-1 moves from the service area 101-1 to the service area 101-2. In the encapsulation IP header of this packet, CoA obtained by the MN 30-1 in the service area 101-2 is applied as the destination address DA 231 and the connection port address of a line L2 in the packet forwarding apparatus 10 is applied as the source address SA 232.

Figure 4:
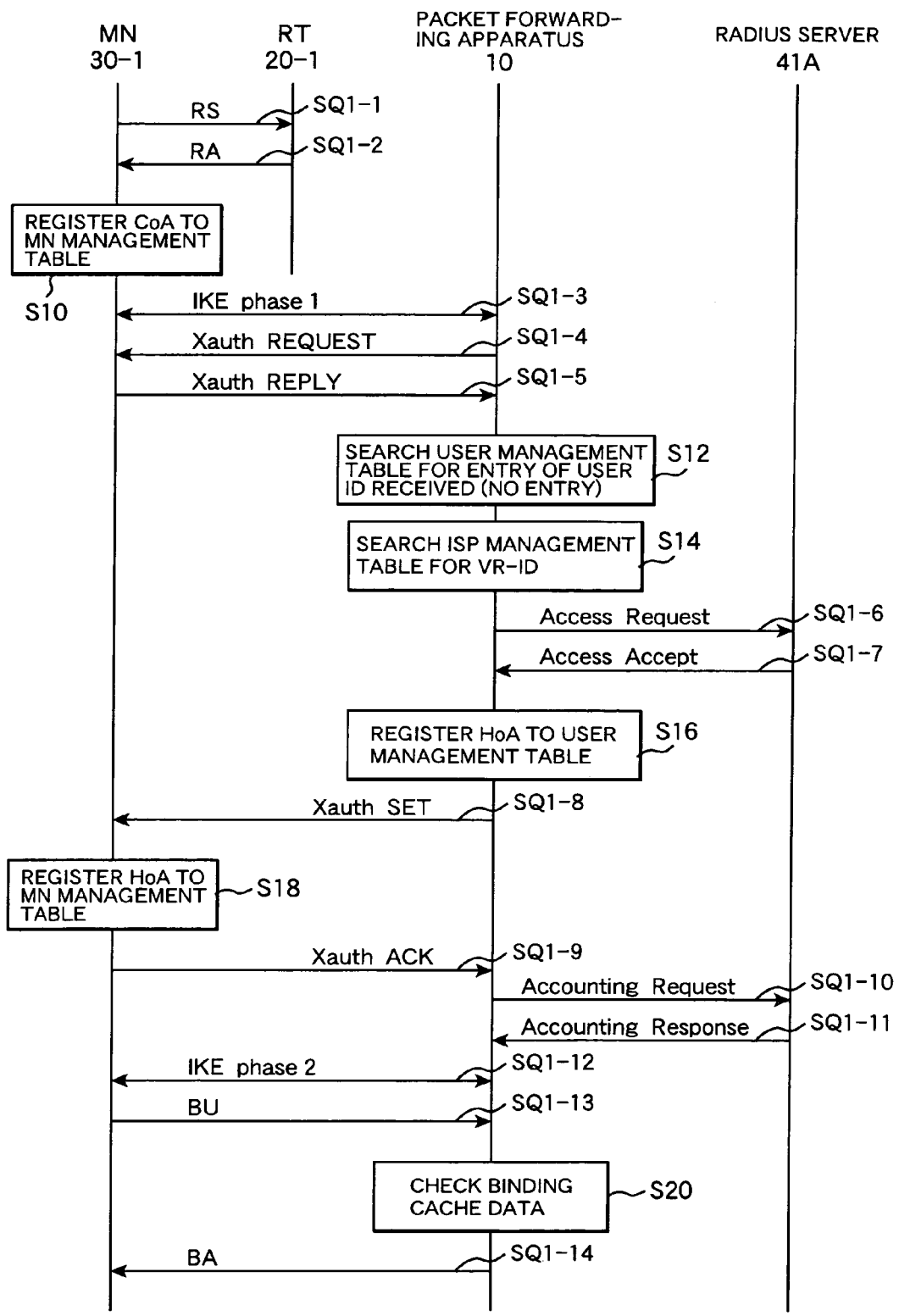
FIG. 4 shows a sequence for establishing a connection between an MN 30-1 and an ISP network 110A in the communication network shown in FIG. 1.

FIG. 4 shows a sequence for establishing a connection between the MN 30-1 and the ISP network 110A in the communication network shown in FIG. 1.

The MN 30-1 transmits a Router Solicitation (RS) message to request the delivery of CoA in the service area 101-1 of the mobile network 100 (SQ1-1). The request message RS is transferred to a router 20-1 connected to the service area 101-1. Upon receiving the RS message, the router 20-1 returns a Router Advertisement (RA) message to the MN 30-1 (SQ1-2).

Upon receiving the RA message, the MN 30-1 interprets a bit (M bit) specifying how to get the address. If the M bit is set to "1", the MN 30-1 gets CoA from an address generation server, which is omitted in FIG. 1, according to a method of automatically generating an IPv6 stateful address. If the M bit is set to "0", the MN 30-1 generates CoA by combining a part (prefix) of the source IP address of the RA message with a part of the MAC address of the MN 30-1, according to a method of automatically generating an IPv6 stateless address.

The MN 30-1 registers the CoA value ("3001::1" in FIG. 1) obtained in the service area 101-1 to an MN management table 38 which will be described later with reference to FIG. 13 (S10). In the MN management table, a user ID "usera@ispa.com" and password "aaaa" of the MN user and the address "3000::ffff" of the packet forwarding apparatus 10 to be the home agent address are registered in advance. Using the home agent address "3000::ffff" specified in the MN management table 38, the MN 30-1 executes a procedure of the Internet Key Exchange (IKE) phase 1 with the packet forwarding apparatus 10 (SQ1-3), which is necessary for connecting the MN 30-1 to the ISP network 110A.

In the IKE phase 1 (SQ1-3), the packet forwarding apparatus 10 exchanges Security Association (SA) information with the MN 30-1 by using ISAKMP (Internet Security Association and Key Management Protocol) according to the procedure described in non-patent documents 2 and 3.

After obtaining the ISAKMP SA information, the packet forwarding apparatus 10 transmits a connection authentication request message (Xauth REQUEST) to the MN 30-1 by using Xauth (Extended Authentication within ISAKMP/Oakley) protocol (SQ1-4). Upon receiving the Xauth REQUEST message, the MN 30-1 transmits a response message (Xauth REPLY) including the user ID "usera@ispa.com" and password "aaaa" retrieved from the MN management table to the packet forwarding apparatus 10 (SQ1-5). The Xauth REPLY message corresponds to a request for connection to the ISP network.

Upon receiving the Xauth REPLY message, the packet forwarding apparatus 10 searches the user management table 16 for an entry including the user ID "usera@ispa.com" specified in the Xauth REPLY message (S12). At the time when the MN 30-1 has been connected to the service area 101-1, the entry including the user ID "usera@ispa.com" is not registered in the user management table 16. Then, the packet forwarding apparatus 10 searches the ISP management table 17 for a VR identifier corresponding to the MN 30-1 to obtain the HoA of the MN 30-1 from the RADIUS server (S14). This search involves extracting the domain name "ispa.com" from the user ID "usera@ispa.com" specified in the Xauth REPLY message and searching the ISP management table 17 for an entry including this domain name "ispa.com".

In the ISP management table 17, an entry is registered that indicates the identifier of the VR (F11A) for the ISP network 110A and the address of the RADIUS server 41A in association with the domain name "ispa.com". The packet forwarding apparatus 10 transmits an access request message (Access Request) destined to the RADIUS server address specified in the retrieved table entry to the RADIUS server 41A (SQ1-6). The Access Request message includes the user ID "usera@ispa.com" and password "aaaa" specified in the Xauth REPLY message. The packet forwarding apparatus 10 generates an entry of the user management table 16 including the above user ID and password and the source address of the Xauth REPLY message and waits for a response from the RADIUS server 41A.

The RADIUS server 41A compares a password registered in advance in association with the user ID "usera@ispa.com" and the password "aaaa" indicated in the access request and authenticates the user. If the user authentication is successful, the RADIUS server 41A returns a response message (Access Accept) giving the home address HoA assigned to the user ID "usera@ispa.com" and a lifetime indicating the HoA validity period to the packet forwarding apparatus 10 (SQ1-7).

Upon receiving the Access Accept message, the packet forwarding apparatus 10 adds the HoA and lifetime specified in the message to the above table entry and registers this table entry to the user management table 16 (S16), and transmits a connection authentication message (Xauth SET) including the above HoA to the MN 30-1 (SQ1-8).

Upon receiving the Xauth SET message, the MN 30-1 registers the HoA value to the MN management table 38 (S18). Then, the MN 30-1 transmits a response message (Xauth ACK) indicating that it has received the connection authentication message (Xauth SET) normally to the packet forwarding apparatus 10 (SQ1-9). Upon receiving the Xauth ACK message, the packet forwarding apparatus 10 generates an accounting request message (Accounting Request) including the user ID and password of the MN 30-1 and transmits this message to the RADIUS server 41A (SQ1-10). Upon receiving the Accounting Request message, the RADIUS server 41A returns a response message (Accounting Response) to the packet forwarding apparatus 10 (SQ1-11) and starts accounting on the packet communication carried out under the user ID.

After that, the packet forwarding apparatus 10 executes IKE phase 2 with the MN 30-1 (SQ1-12). Upon the termination of IKE phase 2, the MN 30-1 transmits a location registration request message BU (Binding Update) according to the Mobile IPv6 defined in IETF RFC 3775 to the packet forwarding apparatus 10 (SQ1-13). An IPv6 packet of the BU message includes, as the source address, the CoA obtained by the MN 30-1 in the service area 101-1 and includes the HoA in a home address option of IPv6 destination option header.

Upon receiving the BU message, the packet forwarding apparatus 10 verifies the HoA and CoA specified in the received message against HoA and CoA registered as Binding Cache data in the user management table (Binding Cache management table) 16 (S20) and, if the HoA and CoA specified in the BU message have no problem, transmits a response message BA (Binding Acknowledgement) to the MN 30-1 (SQ1-14). By receiving the BA message, the MN 30-1 becomes able to access the IP network 120 or communicate with a CN via the ISP network 110A.

If the HoA and CoA specified in the BA message mismatch with the HoA and CoA registered in the user management table 16, the packet forwarding apparatus 10 clears the Security Association (SA) information for the MN 30-1 and deletes the table entry for the MN 30-1 from the user management table, thereby disconnecting the communication with the MN 30-1.

As apparent from the above communication sequence, at the moment of receiving a connection authentication request (Xauth REPLY) occurring in the course of connecting an MN 30 to an ISP network, the packet forwarding apparatus 10 of the present invention identifies the domain name of the network of an ISP with whom the MN user has a service contract, from the user ID specified in the received request and transmits an access request to the authentication server (RADIUS server 41) corresponding to the domain name. Accordingly, it becomes possible to allow the user of a mobile terminal the flexibility of selecting an ISP network to be contracted with.

As will be described later, by managing the validity period (lifetime) of each home address HoA in the user management table 16, when an MN moves to another service area and gets a new CoA, the packet forwarding apparatus 10 can allow the MN to continue communication through a simplified control sequence that omits the transmission of an access request to the RADIUS server, as long as within the validity period of the HoA.

FIG. 5A shows a message format in accordance with the Xauth protocol. The Xauth protocol is defined in draft-ietf-ipsec-isakmp-xauth-06. An Xauth message includes an Xauth identifier in a Vender ID field 701. The Xauth Request, Xauth REPLY, and Xauth SET messages, described for FIG. 4, are discriminated by the contents of a Type field 702 and an Attributes field 703.

The Xauth Request message that is transmitted by the packet forwarding apparatus 10 in SQ1-4 includes, as shown in FIG. 5B, "ISAKMP-CFG-REQUEST" in the Type field 702 and user name attribute "XAUTH-USER-NAME=blank" and password attribute "XAUTH-USER-PASSWORD=blank" in the Attributes field 703.

The Xauth REPLY message transmitted by the MN 30-1 in SQ1-5 includes, as is shown in FIG. 5C, "ISAKMP-CFG-REPLY" in the Type field 702 and specific values (in this example, "usera@ispa.com" and "aaaa") as user name attribute "XAUTH-USER-NAME" and password attribute "XAUTH-USER-PASSWORD" in the Attributes field 703.

The Xauth SET message transmitted by the packet forwarding apparatus 10 in SQ1-8 includes, as shown in FIG. 5D, "ISAKMP-CFG-SET" in the Type field 702, and status attribute "XAUTH-STATUS" indicating the authentication result and message attribute "XAUTH-MESSAGE" specifying the HoA value in the Attributes field 703.

Figure 6:
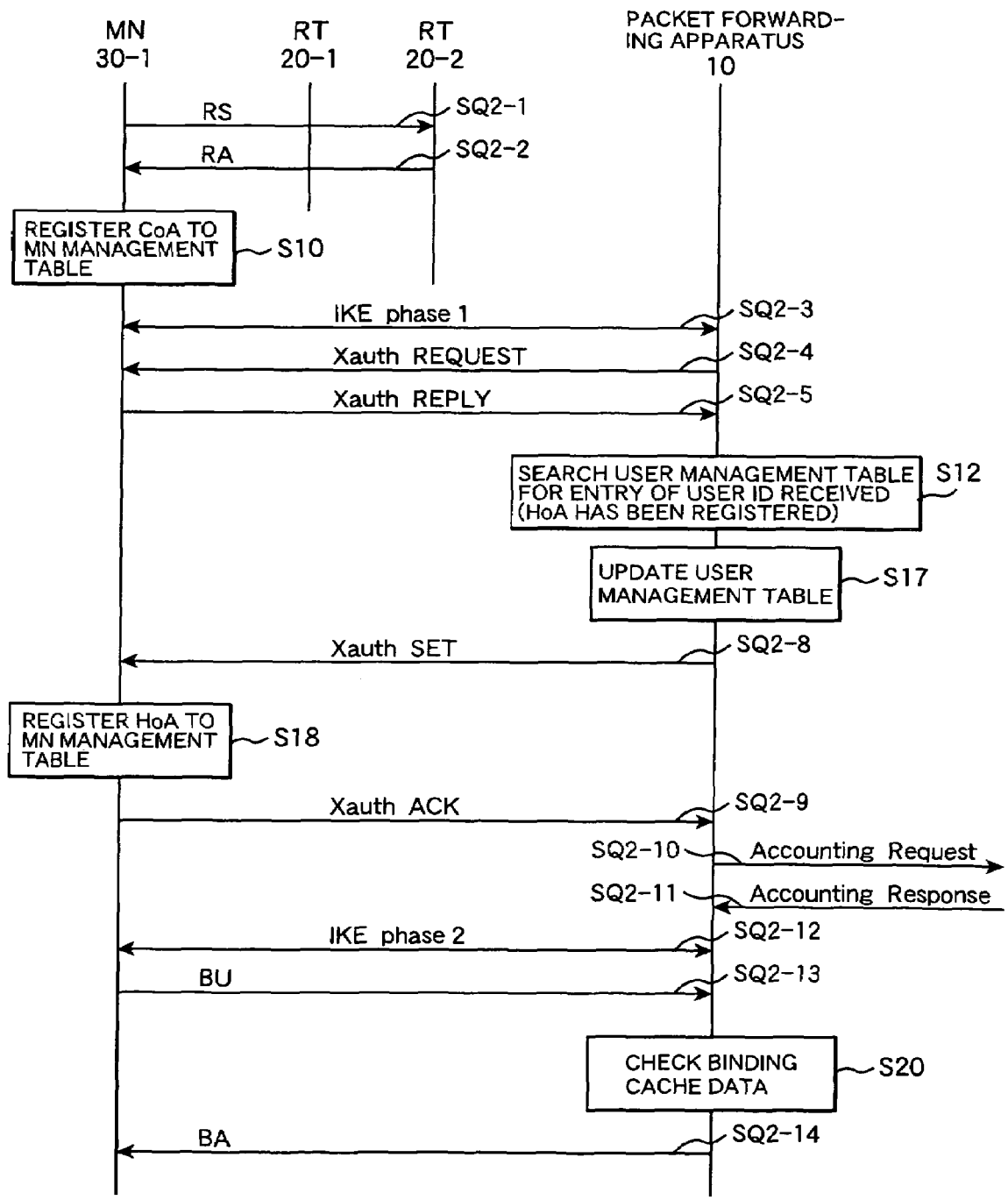
FIG. 6 shows a communication sequence performed when the MN 30-1 has moved to another service area.

FIG. 6 shows a communication sequence performed when the MN 30-1, which has been authenticated by the RADIUS server 41A in the service area 101-1 shown in FIG. 1, has moved from the service area 101-1 to the service area 101-2.

The MN 30-1 transmits a Router Solicitation (RS) message to request the delivery of CoA in the service area 101-2 (SQ2-1). The request message RS is transferred to a router 20-2 connected to the service area 101-2. Upon receiving the RS message, the router 20-2 returns a Router Advertisement (RA) message to the MN 30-1 (SQ2-2). Upon receiving the RA message, the MN 30-1 generates CoA and registers it to the MN management table 38 (S10). After that, the MN 30-1 executes the procedure of the Internet Key Exchange (IKE) phase 1 with the packet forwarding apparatus 10 (SQ2-3) in order to connect the MN 30-1 to the ISP network 110A.

After exchanging ISAKMP SA with the MN 30-1, the packet forwarding apparatus 10 transmits a connection authentication request message (Xauth REQUEST) to the MN 30-1 (SQ2-4). Upon receiving the Xauth REQUEST message, the MN 30-1 transmits a response message (Xauth REPLY) including the user ID "usera@ispa.com" and password "aaaa" to the packet forwarding apparatus 10 (SQ2-5).

Upon receiving the Xauth REPLY message, the packet forwarding apparatus 10 searches the user management table 16 for an entry having the user ID "usera@ispa.com" specified in the received message (S12). At this time, HoA of the MN 30-1 has been registered. Then, the packet forwarding apparatus 10 changes the value of CoA included in the entry having the user ID "usera@ispa.com" in the user management table 16 (S17) and transmits a connection authentication message (Xauth SET) including the HoA to the MN 30-1 (SQ2-8), without searching the ISP management table (S14) and transmitting an access request message to the RADIUS server 41A (SQ1-6) described with reference to FIG. 4.

Upon receiving the Xauth SET message, the MN 30-1 registers the HoA value to the MN management table 38 (S18), and transmits to the packet forwarding apparatus 10 a response message (Xauth ACK) indicating that the connection authentication message (Xauth SET) has been received normally (SQ2-9). Subsequently, the same communication sequence SQ2-10 to SQ2-14 as the sequence SQ1-10 to SQ1-14 described for FIG. 4 is executed. In this case, SQ2-10 and SQ2-11 may be omitted because the accounting request has been already issued to the RADIUS server 41A.

Figure 7:
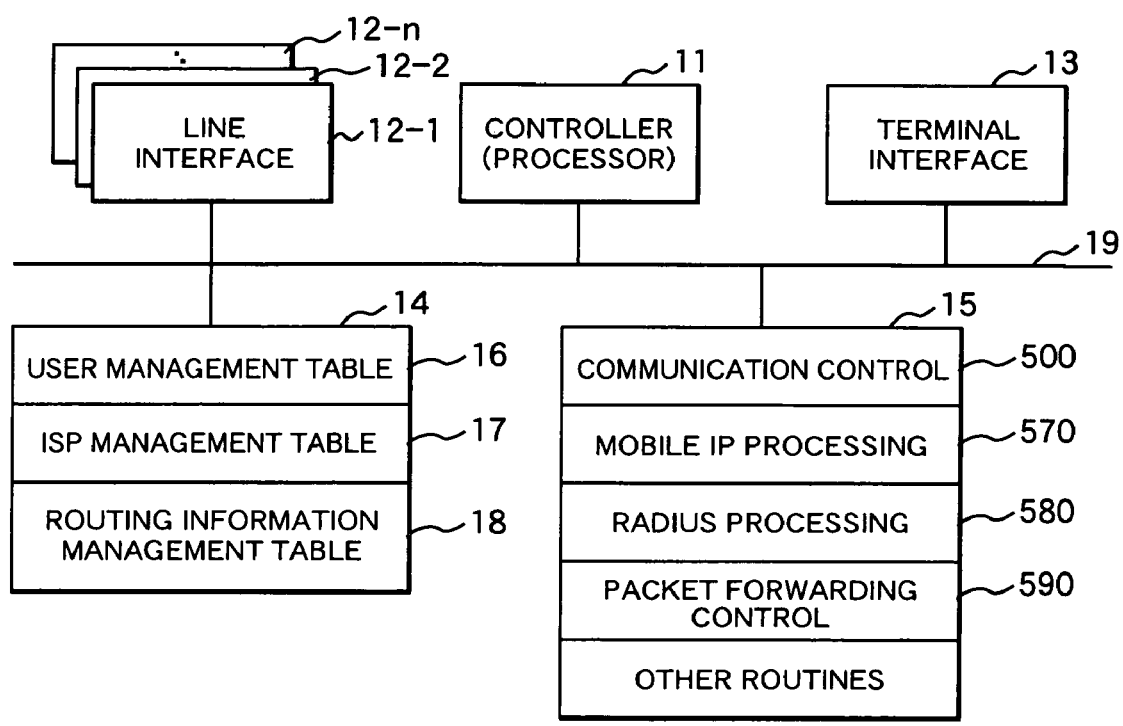
FIG. 7 is a block structural diagram showing an embodiment of the packet forwarding apparatus 10 of the present invention.

FIG. 7 is a block structural diagram showing an embodiment of the packet forwarding apparatus 10.

The packet forwarding apparatus 10 comprises a controller (processor) 11, a plurality of line interfaces 12 (12-1 to 12-n), a terminal interface 13, a data memory 14, a program memory 15 for storing various kinds of programs to be executed by the processor 11, and an internal bus 19 for connecting these components.

The line interfaces 12-1 to 12-n are classified into a first group of line interfaces for accommodating lines L1 to Lm to be connected to routers in the mobile network 100 and a second group of line interfaces for accommodating lines La, 1b, etc. to be connected to routers in the ISP networks 110 or a line to be connected to the IP network. Each of the line interfaces 12 communicates IP packets with one of the routers 20, routers 40 and other communication nodes, in a packet format determined in accordance with the type of MAC layer communication protocol that is applied to the connection lines L, for example, Ethernet. The terminal interface 13 is used to communicate with an operator's control terminal.

In the data memory 14, the user management table 16, ISP management table 17, and routing information management table 18 are created. In the program memory 15, a communication control routine 500, a Mobile IP processing routine 570, a RADIUS processing routine 580, a packet forwarding control routine 590, and other routines are prepared as programs relevant to the present invention.

As will be described later with reference to FIGS. 15 to 17, the communication control routine 500 comprises a plurality of routines such as an ISP connection control routine 510, a lifetime update routine 540, a lifetime check routine 550. The Mobile IP processing routine 570 establishes ISAKMP SA with each MN 30 and creates Xauth REQUEST and Xauth SET messages to be transmitted to the MN 30. The RADIUS processing routine 580 communicates Access Request and Access Accept messages and Accounting Request and Accounting Response messages with a RADIUS server 41.

When an IP packet addressed to the home address HoA of an MN is received from one of the second group line interfaces, the packet forwarding control routine 590 converts the received packet into an encapsulated packet described for FIGS. 3B and 3C, using the binding information of HoA and CoA registered in the user management table 16, and transmits the encapsulated packet to the mobile network through one of the first group line interfaces corresponding to the HoA.

FIGS. 8A and 8B illustrate an embodiment of the user management table 16.

The user management table 16 comprises a plurality of entries 10 each having a user ID 161. Each table entry indicates a password 162, HoA 163, CoA 164, lifetime 165, ISP-adaptive VR identifier 166, and other information 167, associated with the user ID 161. The HoA 163, CoA 164, and lifetime 165 constitute Binding Cache management table information.

A new entry for a user ID of a connection requester is added to the user management table 16 at the time when the packet forwarding apparatus 10 obtains the user's HoA from a RADIUS server 41. However, a new entry may be added to the user management table 16 before transmitting an Access Request to the RADIUS server and the values of HoA 163 and lifetime 165 may be added after receiving an Access Accept. The values of HoA 163 and CoA 164 may be added upon receiving a location registration request (BU) message from the MN. As will be described later, when a disconnection request has been issued from a MN or the lifetime has expired, the entry for the MN is deleted from the user management table 16.

FIG. 8A illustrates the contents of a table entry 160-1 having the user ID "usera@ispa.com" of the MN 30-1 shown in FIG. 1. FIG. 8B illustrates the user management table 16 in which a plurality of entries 160-1 to 160-j have been registered. Other information 167 includes, for example, a sequence number for authentication. As other information 167, for example, an accounting flag may be prepared to indicate whether the transmission of an Accounting Request message is needed. In this case, the accounting flag is set to "0" when a new entry has been registered to the user management table 16, and the packet forwarding apparatus transmits an Accounting Request message to a RADIUS server and changes the accounting flag to "1" when the first Xauth ACK is received from an MN 30. By using the accounting flag in this manner, the transmission of an Accounting Request can be omitted when an Xauth ACK is received after the MN 30 moves to another service area.

FIG. 9 illustrates an embodiment of the ISP management table 17.

The ISP management table 17 comprises a plurality of entries 170-1 to 170-k, each having the domain name 171 of an ISP network 110. Each table entry indicates the correspondence of a domain name 171 to an ISP-adaptive VR identifier 172 and an IP address 173 of a RADIUS server 41.

FIG. 10 illustrates an embodiment of a routing information management table 18.

The routing information management table 18 comprises a plurality of entries 180-1 to 180-p, each indicating the correspondence of an ISP-adaptive VR identifier 181 to a network address 182 and a gateway address 183. Here, the network address 182 denotes the IP address of each communication node in the communication network shown in FIG. 1. The gateway address 183 denotes the address (Next Hop) of an adjacent node connected to the packet forwarding apparatus 10 by a communication line L (L1, L2, etc. and La, Lb, etc.)

When a RADIUS server address "2001:1::1" corresponding to a domain name "ispa.com" is retrieved from the ISP management table 17, for example, the packet forwarding apparatus 10 can transmit an Access Request message to the RADIUS server 41A via a communication line La by searching the routing information management table 18 for a gateway address "2002:10::1" associated with the network address "2001:1::1".

FIG. 11 illustrates a routing table 200 provided in a router 20-1.

The routing table 200 comprises a plurality of entries, each mapping a network address 201 to a gateway address 202. The correspondence of network addresses 201 to gateway addresses 202 is the same as that of the routing information management table 18.

Figures 12, 13A, 13B, 13C:
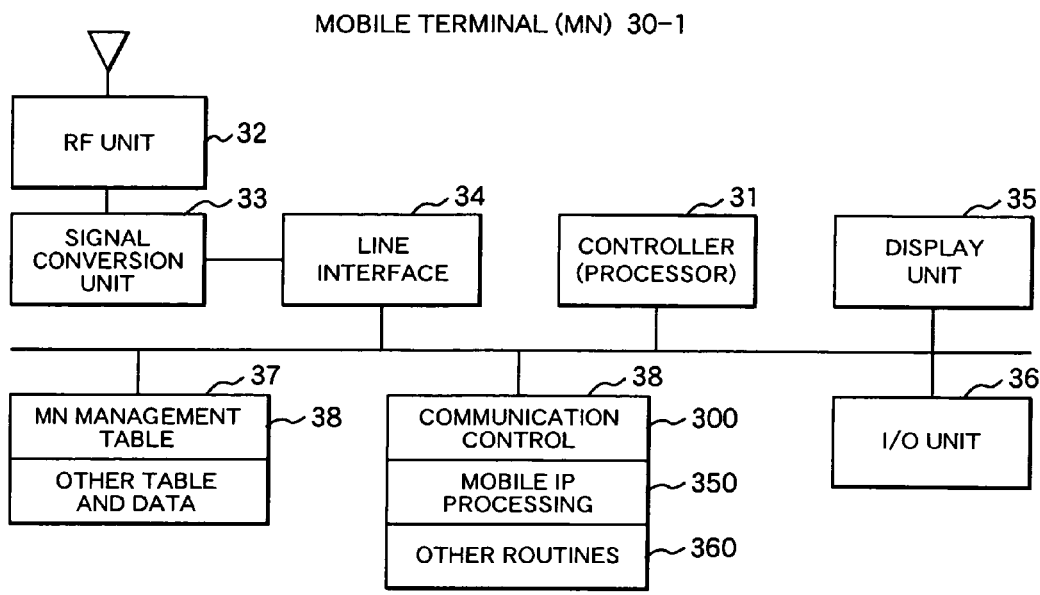
FIG. 12 is a block structural diagram showing an embodiment of a mobile terminal 30.
FIGS. 13A to 13C illustrate an embodiment of an MN management table provided in a mobile terminal 30.

FIG. 12 is a block structural diagram showing an embodiment of a mobile terminal (MN) 30-1. Other terminals (MNs 30-2, 30-3, etc.) connected to the mobile network 100 have functionally the same structure as the MN 30-1.

The MN 30-1 comprises a controller (processor) 31, an RF unit 32 which transmits and receives RF signals to/from a base station situated in a service area 101 in the mobile network via an antenna, a signal conversion unit 33 connected to the RF unit 32 to carry out RF signal modulation/demodulation processing, a line interface 34 connected to the signal conversion unit 33, a display unit 35, an I/O unit 36 including various kinds of buttons for data input, a microphone, a speaker, etc., a data memory 37, a program memory 38, and an internal bus 39 for connecting these components 34 to 38.

The line interface 34 converts IP packets to be transmitted from the MN 30-1 into a communication frame format depending on a communication protocol on a wireless channel and converts communication frames received through a wireless channel into IP packets.

In the data memory 37, the MN management table 38 and other tables are created. In the program memory 38, a communication control routine 300, a Mobile IP processing routine 350, and other routines 360 are stored as programs relevant to the present invention which are executed by the processor 31. As will be described later, the communication control routine 300 comprises a plurality of routines such as a connection control routine 310 and a disconnection control routine 330.

FIGS. 13A to 13C illustrate the structure of the MN management table 38 and transition of its contents.

The MN management table 38 comprises a user ID field 381, a password field 382, a home agent address field 383, an HoA field 384, a CoA field 385, and other information field 386.

FIG. 13A shows the MN management table 38 in its initial state before the MN 30-1 is connected to the mobile network 100. In the initial state, the MN management table 38 holds valid data in the user ID 381, password 382, and home agent address 383 fields. Here, the home agent address field 383 contains the IP address of the packet forwarding apparatus 10. The password may be entered, when appropriate, from the I/O unit 36 by the user. The following description of the embodiment assumes that a password "aaaa" once entered is stored in the MN management table 38 and the processor 31 communicates with the packet forwarding apparatus 10 using the password read out from the MN management table 38.

FIG. 13B shows the MN management table 38 at the time when the MN 30-1 has obtained CoA after connected to the service area 101-1. FIG. 13C shows the MN management table 38 at the time when the MN 30-1 has obtained HoA after connected to the packet forwarding apparatus 10.

Figure 14:
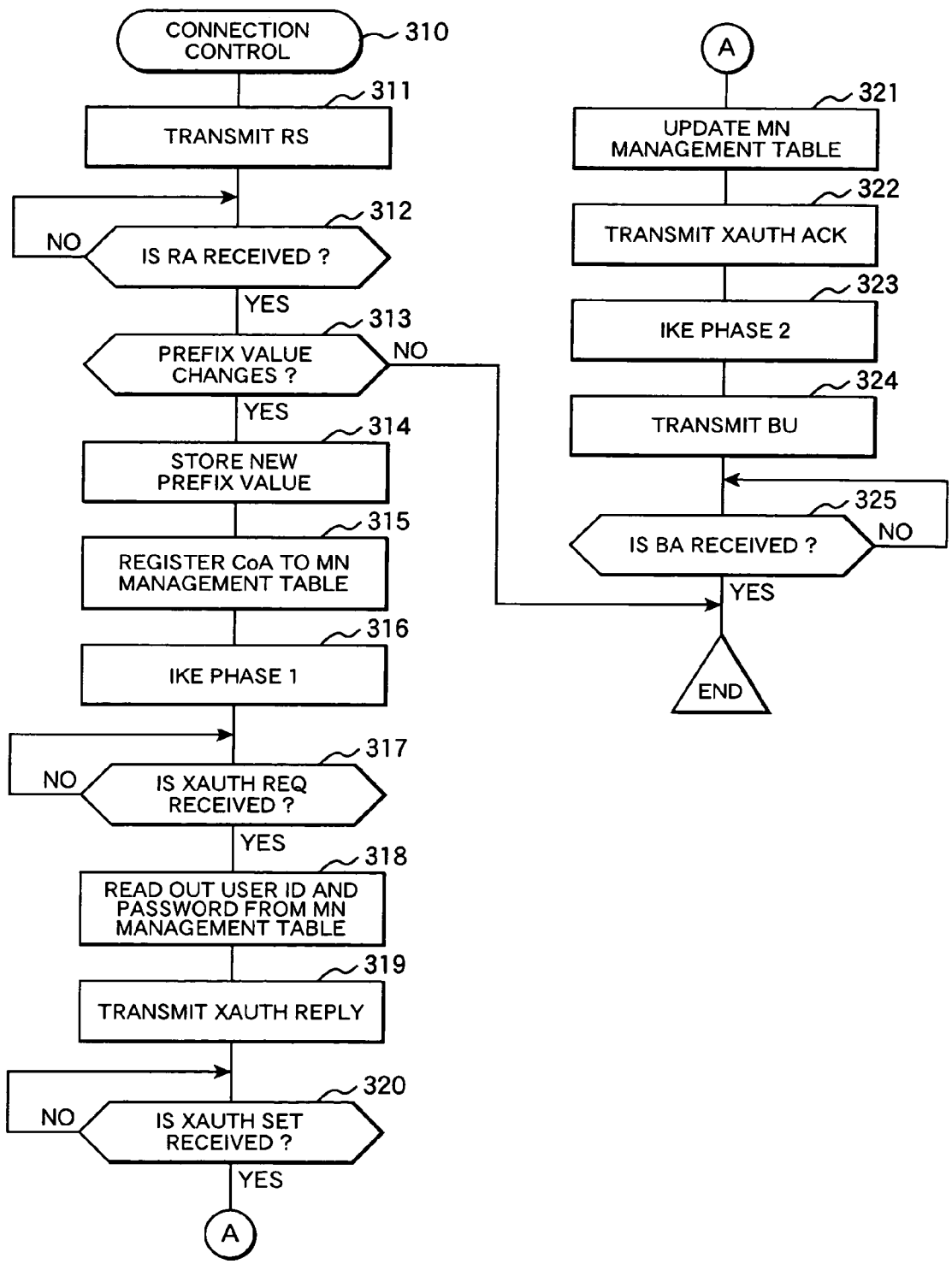
FIG. 14 is a flowchart illustrating an embodiment of a connection control routine 310 to be executed by the processor of a mobile terminal MN 30.

FIG. 14 illustrates an embodiment of the connection control routine 310 to be periodically executed by the processor 31 to connect the MN 30-1 to the service area 101.

After starting the execution of the connection control routine 310, the processor 31 transmits a Router Solicitation (RS) message (step 311) and waits for receiving a Router Advertisement (RA) message (312). Upon receiving the RA message, the processor 31 extracts a prefix portion from the source IP address of the received message and compares the prefix to the previous prefix value stored at the last time execution of the connection control routine 310 and determines whether the prefix value has changed (313). If the prefix value remains unchanged, the processor 31 terminates this routine.

Here, the previous prefix value is held in the memory 37 as long as the MN 30-1 is in communication in the mobile network 100 and erased each time communication is disconnected. When the prefix value has changed, that is, when the MN 30-1 has received an RA message in response to the first RS message transmitted in the mobile network 100 or when the MN 30-1 being in communication in one service area has moved to another service area and received the first RA message in this area, the processor stores a new prefix value replacing the previous prefix value (314) and registers CoA to the MN management table 38 (315). A method of generating CoA is specified by the M bit value included in the RA message, as described before.

After that, the processor 31 exchanges ISAKMP SA (Security Association) information of IKE phase 1 with the packet forwarding apparatus 10 specified by the home agent address 383 in the MN management table 38 (316) and waits for receiving a connection authentication request message (Xauth REQUEST) from the packet forwarding apparatus 10 (317). Upon receiving the Xauth REQUEST message, the processor 31 read out the user ID 381 and password 382 from the MN management table 38 (318), creates an Xauth REPLY to transmits it to the packet forwarding apparatus 10 (319), and waits for receiving a connection authentication message (Xauth SET) from the packet forwarding apparatus 10 (320).

Upon receiving the Xauth SET message, the processor 31 registers the HoA value specified in the message to the MN management table 38 (321) and transmits a response message (Xauth ACK) to the packet forwarding apparatus 10 (322). After that, the processor executes the IKE phase 2 procedure with the packet forwarding apparatus 10 (323), creates a Mobile IP location registration request message BU (Binding Update) applying CoA and HoA read out from the MN management table 38 to this message to transmit the message BU to the packet forwarding apparatus 10 (324), and waits for receiving a response message BA (Binding ACK) from the packet forwarding apparatus 10 (325). Upon receiving the BA message, the processor 31 terminates this routine and enables the MN 30-1 to communicate with a CN. The above connection control routine 310 is carried out in conjunction with the Mobile IP processing routine 350 to communicate control messages with the packet forwarding apparatus 10, as appropriate.

Figure 15:
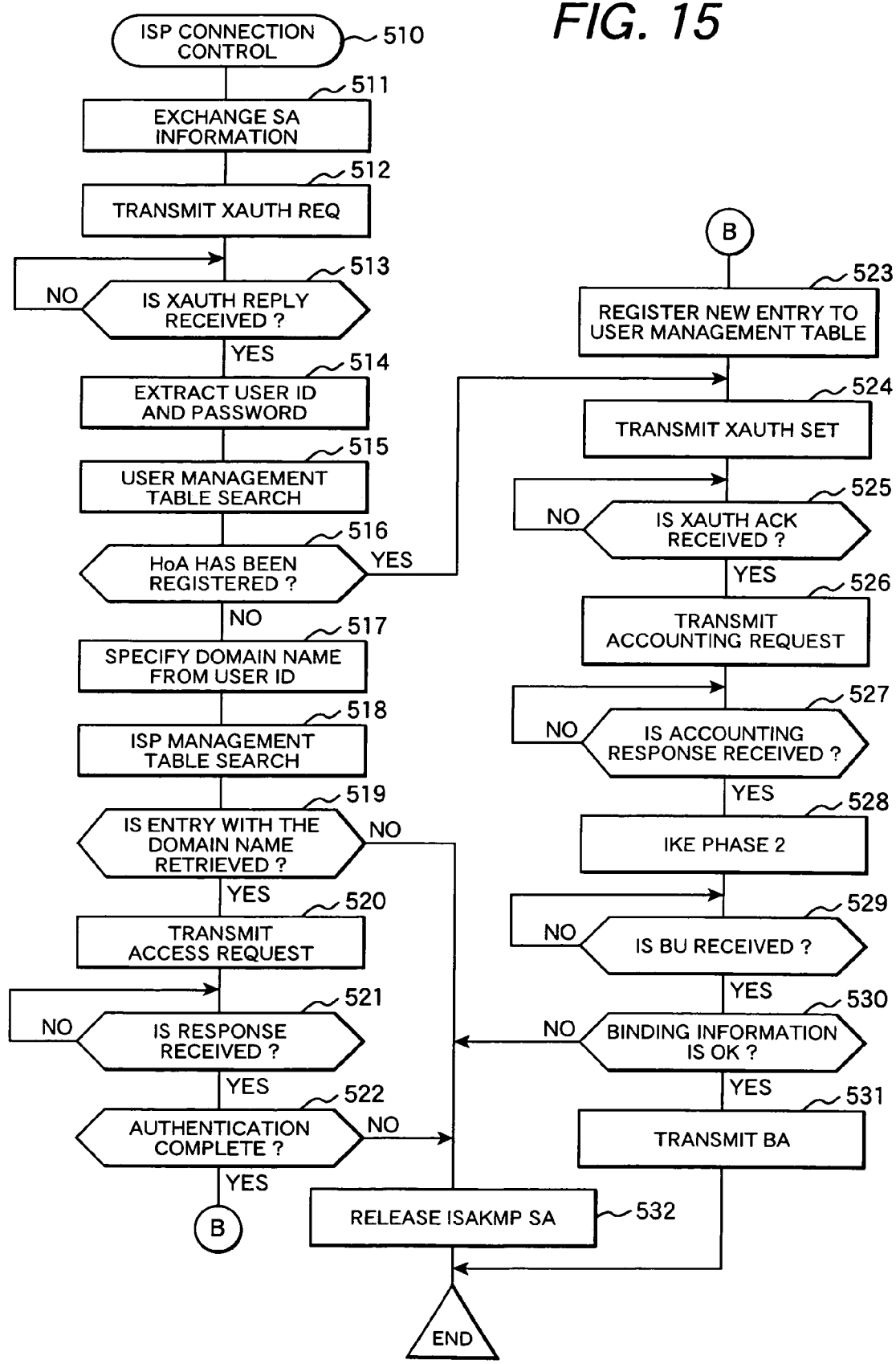
FIG. 15 is a flowchart illustrating an embodiment of an ISP connection control routine 510 to be executed by the processor of the packet forwarding apparatus 10.

FIG. 15 illustrates an embodiment of the ISP connection control routine 510 to be executed by the processor 11 of the packet forwarding apparatus 10.

Upon receiving a control message for IKE phase 1 from an MN 30, the processor 11 starts the execution of the ISP connection control routine 510. After exchanging ISAKMP SA information with the MN 30 (511), the processor 11 transmits a connection authentication request message (Xauth REQUEST) to the MN 30 (512) and waits for receiving a connection authentication response message (Xauth REPLY) (513). Upon receiving the Xauth REPLY, the processor 11 extracts the user ID and password from the received message (514), searches the user management table 16 for an entry matching with the user ID (515), and determines whether HoA has been already registered in the user management table 16 (516).

At the time when the MN 30 has first been connected to the mobile network 100, an entry matching with the user ID does not exist in the user management table 16 and, therefore, it is determined that HoA is unregistered. In this case, the processor 11 specifies a domain name from the user ID (517) and searches the ISP management table 17 for an entry matching with the domain name (518). As a result of this table search (519), if no entry matching with the domain name is found, that is, if the user ID has no relation to any domain name registered in the ISP management table 17, the processor 11 determines that the requesting user is not a subscriber to the IP connection service, clears the ISAKMP SA information (532), and terminates this routine.

If an entry matching with the domain name is found from the ISP management table 17, the processor 11 creates an access request message (Access Request) addressed to a RADIUS server specified in the above entry, transmits this message to the RADIUS server (520), and waits for a response message (Access Accept) from the RADIUS server (521). Upon receiving the response message, the processor 11 determines whether the user has been authenticated by the RADIUS server (522). If the user authentication is unsuccessful, the processor 11 clears the ISAKMP SA information (532) and terminates this routine.

If the user authentication is successful, the processor 11 registers a new entry to the user management table 16 (523). The entry includes the user ID and password extracted from the Xauth REPLY message, CoA specified by the source address of the Xauth REPLY message, HoA and lifetime specified in the response message (Access Accept), an ISP-adaptive VR identifier specified in the entry found from the ISP management table 17. The processor 11 creates an Xauth SET message including the HoA specified in the Access Accept message, transmits the message to the MN 30 (524), and waits for receiving a response message (Xauth ACK) from the MN 30 (525). Upon receiving the Xauth ACK, the processor 11 transmits an accounting request message (Accounting Request) including the user ID and password to the RADIUS server (526) and waits for receiving a response message from the RADIUS server (527). Upon receiving the response message (Accounting ACK) from the RADIUS server, the processor 11 executes the IKE phase 2 procedure with the MN 30 (528) and waits for a location registration request message BU (Binding Update) from the MN 30 (529).

Upon receiving the BU message, the processor 11 verifies the HoA and CoA specified in the received message against HoA and CoA registered in the user management table (530). If the HoA and CoA have no problem, the processor returns a response message BA (Binding ACK) to the MN 30 (531) and terminates this routine. If the HoA and CoA specified in the BU message conflicts with the binding information of HoA and CoA registered in the user management table 16, the processor 11 clears the ISAKMP SA information (532) and terminates this routine.

If it is found at step 516 that HoA has already been registered in the user management table 16, the processor 11 judges that the connection authentication response message (Xauth REPLY) received this time has been transmitted from a new service area to which the MN 30 has removed. In this case, the processor 11 executes the step 524 and subsequent procedure, skipping the procedure (steps 517 to 523) for transmitting an Access Request message to the RADIUS server. If it is preferred to omit the transmission of Accounting Request message in response to the Xauth REPLY message received when the MN has moved to another area, the above-described accounting flag may be used. In this case, the procedure may be modified such that, for example, the processor 11 changes the value of flag between the steps 527 and 528, checks the accounting flag between the steps 525 and 526, and executes the step 528, skipping the steps 526 and 527 when the accounting flag is set to "1".

Next, it will be described about HoA lifetime. To make effective use of communication resources, the packet forwarding apparatus 10 periodically checks the lifetime in each entry registered in the user management table 16 and invalidates HoA for which the lifetime has expired and automatically disconnects the communication with the MS. Each MN that wishes to avoid automatic disconnection upon lifetime expiry issues a keep-alive signal (rekey message) at certain intervals. Each time receiving the rekey message, the packet forwarding apparatus 10 resets the HoA lifetime assigned to the rekey message sender MN to the initial value. By generating rekey messages periodically, the MN being in communication can prevent a timeout disconnection.

Figure 16:
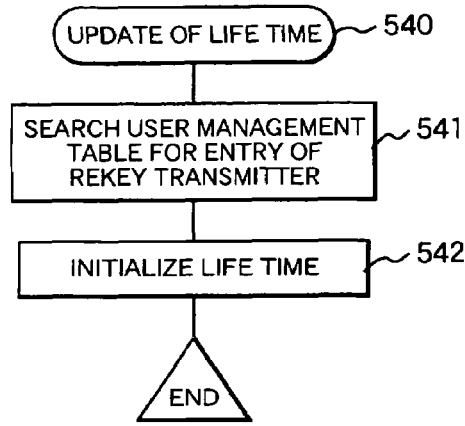
FIG. 16 is a flowchart illustrating an embodiment of a lifetime update routine 540 to be executed by the processor of the packet forwarding apparatus 10.

FIG. 16 shows a flowchart of the lifetime update routine 540 to be executed by the processor 11 of the packet forwarding apparatus 10 each time receiving a rekey message.

In the lifetime update routine 540, the processor 11 searches the user management table 16 for an entry in which CoA matches the source address of the rekey message received (step 541), resets the value of lifetime 165 in the entry found in the table to the initial value (542), and terminates this routine.

If the RADIUS server 41 assigns an equal value Tc of lifetime to each user when HoA is delivered, the processor 11 may return the current value of lifetime to the fixed value Tc at step 542. If the RADIUS server 41 assigns a different value Tv of lifetime on a user-by-user basis, it is preferable to store an initial value 165A and a current value 165B of lifetime separately in the user management table 16. The processor 11 may store the current value of lifetime and the timestamp of the last time at which the rekey message was received, so that each time a rekey message is received, time elapsed from the timestamp of the last rekey message can be added to the lifetime.

Figure 17:
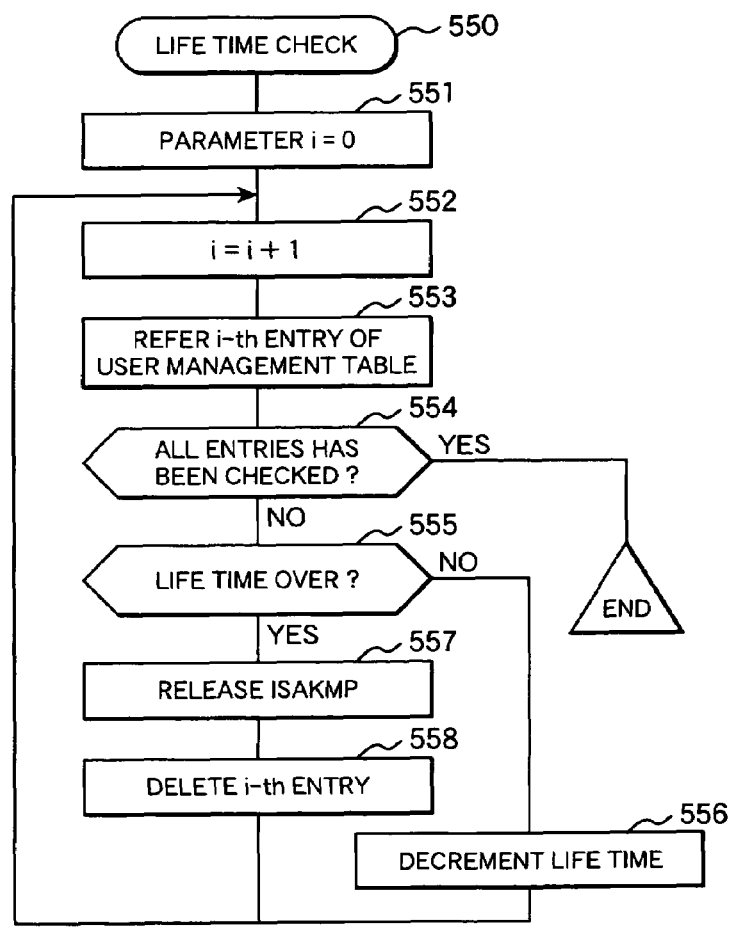
FIG. 17 is a flowchart illustrating an embodiment of a lifetime check routine 550 to be executed by the processor of the packet forwarding apparatus 10.

FIG. 17 shows a flowchart of the lifetime check routine 550 to be executed by the processor 11 at intervals of a period ΔT. Here, it is assumed that, in the user management tale 16, a plurality of entries 160-1 to 160-j containing valid data are arranged in a logically consistent sequence without including invalid entries therein. This type of table structure can be realized by adopting a linked list in which each entry is linked to the next entry with an address pointer or by sorting or shifting the entries each time an entry has been deleted from the table.

In the lifetime check routine 550, the processor 11 initializes the value of a parameter i for identifying an entry in the user management table 16 to 0 (step 551), increments the parameter i by one (552), and refers to the i-th entry in the user management table 16 (553). If the i-th entry is an invalid entry, the processor 11 judges that all entries have been checked (554) and terminates this routine.

If the i-th entry is a valid entry, the processor checks the value of lifetime 165 and determines whether the HoA lifetime has expired (555). Here, the processor compares the current value T of lift time to ΔT. If T>ΔT, the processor decreases the lifetime (T=T−ΔT) (556) and returns to step 552. If T≦ΔT, the processor 11 judges that the HoA lifetime has expired, release the ISAKMP SA information (557), deletes the i-th entry from the user management table 16 or invalidates it, and returns to step 552.

Figure 18:
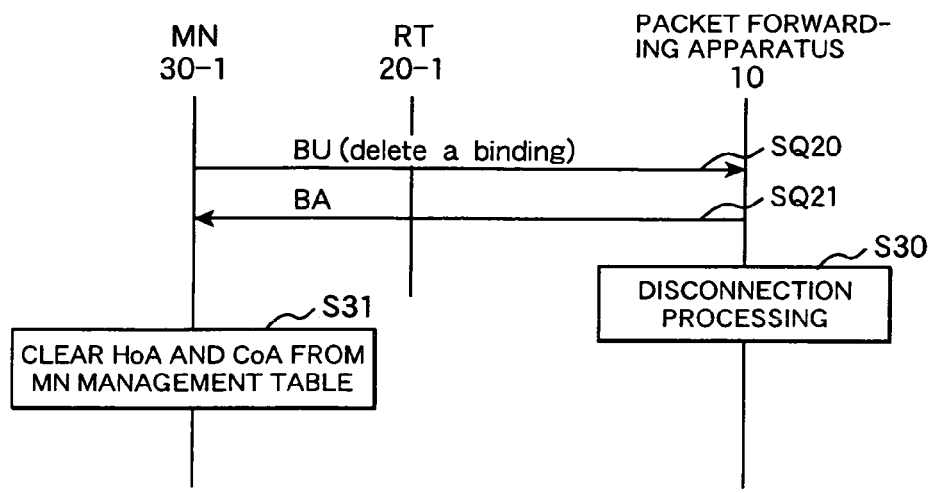
FIG. 18 shows a communication disconnection sequence initiated from a mobile terminal 30.

FIG. 18 shows a communication disconnection sequence initiated from the MN 30-1.

When the MN 30-1 transmits a disconnection request message BU (delete a binding) (SQ20), the packet forwarding apparatus 10 returns a response message BA (Binding ACK) to the MN 30-1 (SQ21) and executes the disconnection processing S30. Upon receiving the BA message, the MN 30-1 deletes HoA and CoA from the MN management table 38 (S31).

Figure 19:
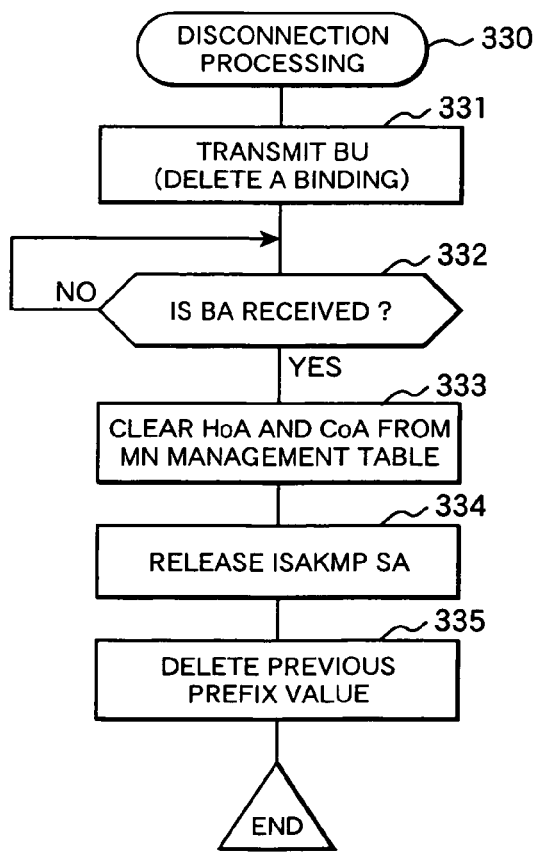
FIG. 19 is a flowchart illustrating an embodiment of a disconnection control routine 330 to be executed by the processor of a mobile terminal MN 30.

FIG. 19 illustrates an embodiment of the disconnection control routine 330 to be executed by the processor 31 of the MN 30-1.

When the user of the MN 30-1 instructs to disconnect communication, the processor 31 starts the disconnection control routine 330, transmits a disconnection request message BU (delete a binding) to the packet forwarding apparatus 10 (step 331) and waits for receiving a BA message (332). Upon receiving the BA message from the packet forwarding apparatus 10, the processor 31 deletes HoA and CoA from the MN management table 38 (333), release the ISAKMP SA information (334), deletes the previous prefix value from the memory 37 (335), and terminates this routine.

Figure 20:
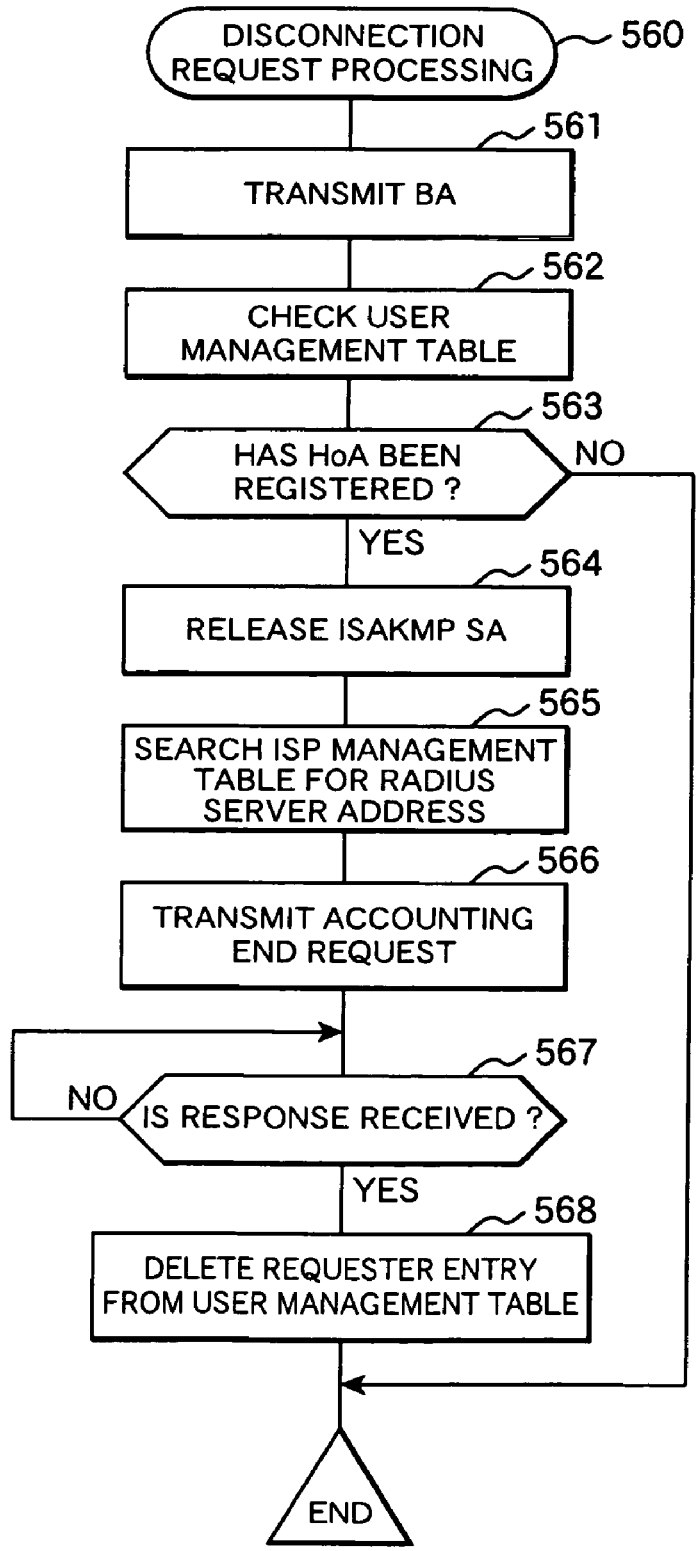
FIG. 20 is a flowchart illustrating an embodiment of a disconnection request processing routine 560 to be executed by the processor of the packet forwarding apparatus 10.

FIG. 20 illustrates an embodiment of a disconnection request processing routine 560 to be executed by the processor 11 of the packet forwarding apparatus 10 when receiving a disconnection request message BU (delete a binding) from an MN.

Starting the disconnection request processing routine 560, the processor 11 returns a response message BA (Binding ACK) to the requesting MN (step 561) and refers to the user management table 16. If there is an entry having CoA matched with the source address CoA of the disconnection request message in the user management table 16, that is, the HoA of the disconnection requesting MN has been registered (563), the processor 11 release the ISAKMP SA information (564). After that, the processor 11 searches the ISP management table 17 for the relevant RADIUS server address 173 according to the ISP-adaptive VR identifier 166 specified in the above entry (565) and transmits a request message to terminate accounting on the user ID specified in the above entry to the RADIUS server (566).

Upon receiving a response message from the RADIUS server (567), the processor 11 deletes the entry of the disconnection requesting MN user from the user management table 16 (568) and terminates this routine. If there is no entry related to the disconnection request in the user management table 16, the processor 11 terminates this routine without releasing the SA information.

In the above described embodiment, the management of idle home addresses HoA is distributed to a plurality of ISP networks in such a manner that an authentication server (RADIUS server) 41 belonging to each ISP has a home address pool and assigns HoA to a mobile terminal MN in response to a connection request from the MN. However, the packet forwarding apparatus 10 may be adapted to make an integrated management of all home addresses with an address pool and assign an idle HoA to an MN whose user has been authenticated successfully.

What is claimed is:

1. A packet forwarding apparatus for selectively connecting each mobile terminal coupled with a mobile network to one of a plurality of Internet Service Provider (ISP) networks, the packet forwarding apparatus comprising:

a first group of line interfaces for connecting the packet forwarding apparatus to a plurality of routers deployed to service areas forming the mobile network;

a second group of line interfaces each for connecting the packet forwarding apparatus to one of the Internet and routers belonging to different ISP networks;

a controller having a mobile IP (Internet Protocol) terminating virtual router function and a plurality of ISP adaptive virtual router functions corresponding to said ISP networks;

an ISP management table comprising:

a plurality of entries, each indicating correspondence of a domain name of one of said ISP networks to an identifier of one of said ISP adaptive virtual router functions corresponding to the ISP network and an address of an authentication server belonging to the ISP network; and a routing information table comprising:

a plurality of entries, each entry indicating in association with the identifier of one of said virtual router functions, an IP address of a communication apparatus connected to one of said ISP networks, the internet and said mobile network, and a next hop address, indicating an adjacent node connected to the packet forwarding apparatus, wherein said mobile IP terminating virtual router function of said controller identifies, upon receiving from a mobile terminal in one of said service areas a connection request to connect the mobile terminal to a specific one of said ISP networks with which the mobile terminal has a service contract, the domain name of the ISP network from a user identifier (ID) included in the connection request and retrieves the authentication server address and the identifier of one of said ISP adaptive virtual router functions corresponding to the domain name from said ISP management table, wherein the ISP adaptive virtual router function specified by the retrieved identifier searches said routing information table for the next hop address stored in association with the IP address matched with the retrieved authentication server address, transmits an authentication request including the user ID and password specified in said connection request to one of said authentication servers, which belongs to the specific ISP network, through one of said second group of line interfaces in accordance with the retrieved authentication server address and the next hop address, and receives a result of authentication from said authentication server, and wherein said mobile IP terminating function notifies the requesting mobile terminal of the result of authentication.

2. The packet forwarding apparatus according to claim 1, wherein said mobile IP terminating virtual router function of said controller transmits to said requesting mobile terminal a message indicating a home address to be assigned to the mobile terminal in response to the result of authentication received from said authentication server.

3. The packet forwarding apparatus according to claim 2, wherein said ISP adaptive virtual router function of said controller receives a home address to be assigned to said mobile terminal together with said result of authentication from said authentication server, and said mobile IP terminating virtual router function transmits said message indicating the home address to said requesting mobile terminal.

4. The packet forwarding apparatus according to claim 2, further comprising:

a user management table comprising a plurality of entries, each indicating the correspondence of the user ID of each mobile terminal coupled with said mobile network to a home address and a care-of address, wherein said controller converts a packet destined to the home address of said requesting mobile terminal into an encapsulated packet destined to the care-of address specified in said user management table when the packet was received from one of said second group of line interfaces, and transmits the packet to said mobile network through one of said first group line interfaces in accordance with said care-of address and the next hop address stored in said routing information table in association with the IP address matched with the care-of address.

5. The packet forwarding apparatus according to claim 4, wherein said ISP adaptive virtual router function of said controller searches said user management table for an entry corresponding to said mobile terminal having transmitted said connection request, and makes said mobile IP terminating virtual router function to transmit said message indicating the home address to said requesting mobile terminal without transmitting an authentication request to said authentication server, if the address of the mobile terminal has been registered in said user management table.

6. The packet forwarding apparatus according to claim 4, wherein each entry of said user management table includes a lifetime of the home address, and wherein said controller invalidates an entry for which the lifetime has expired and automatically disconnects the communication with the mobile terminal identified by the entry.

7. The packet forwarding apparatus according to claim 6, wherein said controller updates the lifetime of the home address of a mobile terminal each time a keep-alive signal is received from the mobile terminal.

8. The packet forwarding apparatus according to claim 4, wherein said controller invalidates the entry for a mobile terminal in said user management table when a request to disconnect communication is received from the mobile terminal, and disconnects the communication with the mobile terminal.

9. The packet forwarding apparatus according to claim 1, wherein each of said ISP adaptive virtual router functions of said controller communicates with said authentication server according to a Remote Authentication Dial In User Service (RADIUS) protocol, and wherein said mobile IP terminating virtual router function exchanges said connection request and a response with said requesting mobile terminal according to a protocol Xauth (Extended Authentication within ISAKMP (Internet Security Association and Key Management Protocol)/Oakley).

10. The packet forwarding apparatus according to claim 1, wherein when an acknowledgement message is received from said requesting mobile terminal in response to the message indicating said home address, said mobile IP terminating virtual router function of said controller executes a communication procedure for The Internet Key Exchange (IKE) and mobile IP location registration with the mobile terminal, after performing a communication procedure for accounting on the mobile terminal with said authentication server by said ISP adaptive virtual router function.

11. A packet forwarding apparatus for selectively connecting each mobile terminal in a mobile network to one of a plurality of Internet Service Provider (ISP) networks, the packet forwarding apparatus being connectable to a plurality of routers deployed to service areas forming the mobile network and to a plurality of routers belonging to different ISP networks, comprising:

a controller having a mobile IP terminating virtual router function and a plurality of ISP adaptive virtual router functions corresponding to said ISP networks;

an ISP management table comprising a plurality of entries, each entry indicating the correspondence of a domain name of one of said ISP networks to an identifier of one of said ISP adaptive virtual router functions corresponding to the ISP network and an address of an authentication server belonging to the ISP network;

a routing information table comprising:

a plurality of entries, each entry indicating in association with the identifier of one of said virtual router functions, an Internet Protocol (IP) address of a communication apparatus connected to one of said ISP networks, the internet and said mobile network, and a next hop address indicating an adjacent node connected to the packet forwarding apparatus; and a user management table for managing binding information of home address and care-of address for a plurality of groups of mobile terminals corresponding to different ISP networks, wherein said mobile IP terminating virtual router function specifies the address of one of authentication servers and selects one of said ISP adaptive virtual router functions corresponding to the authentication server by referring to said ISP management table in accordance with the domain name of ISP network that is specified from a user identifier (ID) included in an ISP connection request from one of said mobile terminals connected to said mobile network so that the selected ISP adaptive virtual router function transmits an access request to the authentication server belonging to one of said ISP networks with which the mobile terminal has a service contract, and wherein the mobile IP terminating virtual router function terminates each of Mobile IP location registration requests received from the plurality of groups of mobile terminals subscribed to different ISP networks.

* * * * *

UNITED STATES PATENT AND TRADEMARK OFFICE
CERTIFICATE OF CORRECTION

PATENT NO. : 7,616,615 B2  Page 1 of 1
APPLICATION NO. : 11/342850
DATED : November 10, 2009
INVENTOR(S) : Noriyuki Sueyoshi et al.

It is certified that error appears in the above-identified patent and that said Letters Patent is hereby corrected as shown below:

-- (*) Notice: Subject to any disclaimer, the term of this patent is extended or adjusted under 35 U.S.C. 154(b) by 256 days.

This patent is subject to a terminal disclaimer --

Signed and Sealed this

Nineteenth Day of January, 2010

David J. Kappos
*Director of the United States Patent and Trademark Office*